Patented June 1, 1948

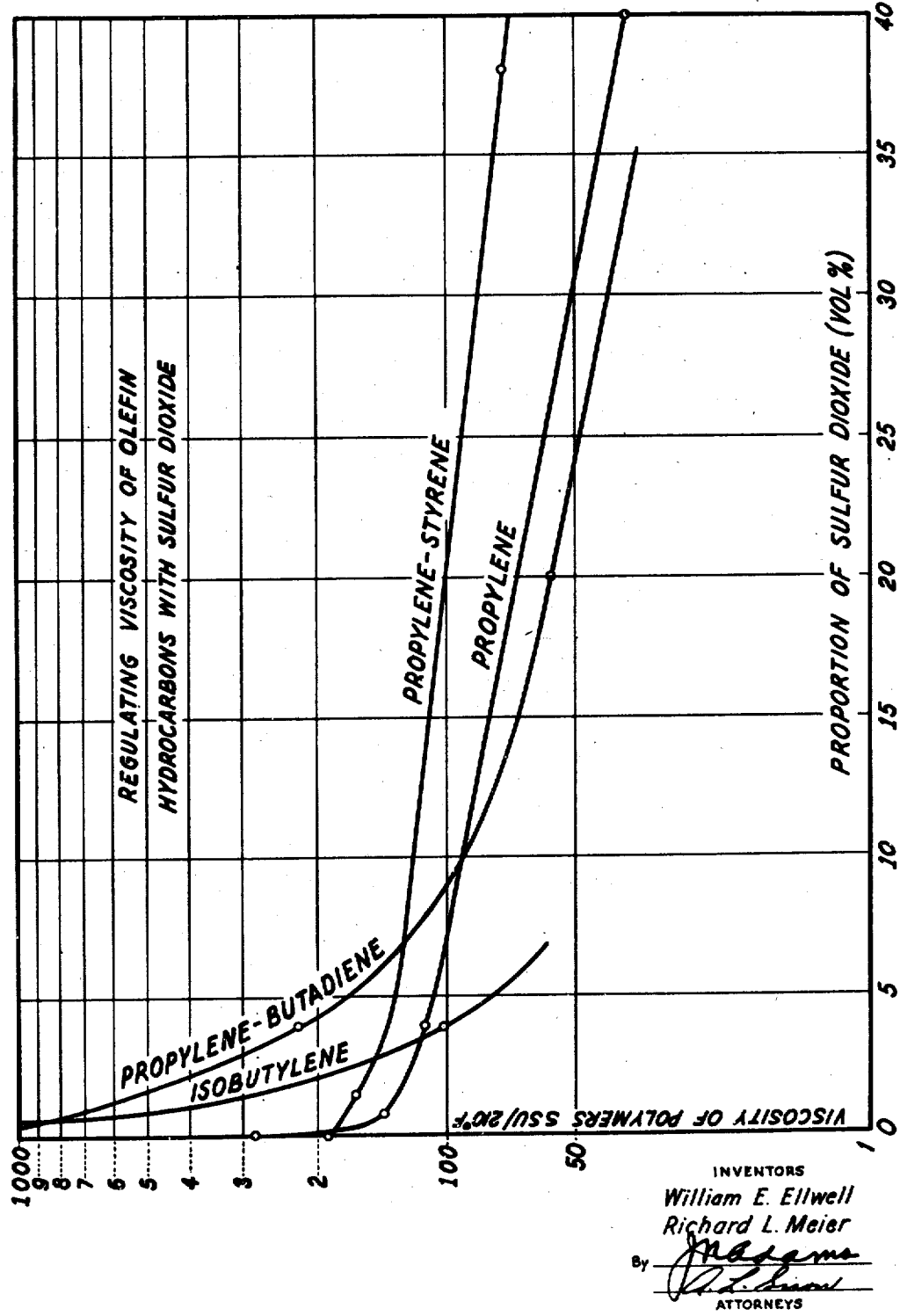

2,442,644

UNITED STATES PATENT OFFICE 2,442,644

METHOD OF CONTROLLING VISCOSITY OF HYDROCARBON POLYMERS

William E. Elwell and Richard L. Meier, Berkeley, Calif., assignors to California Research Corporation, San Francisco, Calif., a corporation of Delaware Application April 2, 1946, Serial No. 659,024

14 Claims. (Cl. 260—669)

This invention relates to a method of controlling the viscosity of the polymers obtained by polymerizing unsaturated hydrocarbons with boron fluoride catalyst.

This method is particularly applicable to the polymerization of mono-olefins with boron fluoride catalyst; but it may likewise be applied to the copolymerization of said mono-olefins with diolefins or with certain other unsaturated hydrocarbons, e. g., styrene.

In our copending application entitled "Process of activating polymerization of hydrocarbons" and filed on the same date as the present application, it has been disclosed that the polymerization of mono-olefins as well as the copolymerization of said mono-olefins and diolefins with boron fluoride catalyst may be substantially enhanced by the presence of small amounts of sulfur dioxide. At the same time, it has been pointed out that the use of such sulfur dioxide activator results in improved yields of polymeric products having a somewhat lower viscosity than the products obtained in the absence of the sulfur dioxide activator.

We have discovered that, by increasing the concentration of sulfur dioxide above the range of amounts required to activate the polymerization in the presence of boron fluoride up to 50% by volume (or even more) of the olefins present, it is possible to regulate the viscosity and, consequently, the molecular weight of the polymeric product. With higher concentration of sulfur dioxide, the viscosity of the polymer decreases, and conversely, with lower concentrations of sulfur dioxide, the viscosity of the polymer increases.

Briefly stated, our invention consists in a method of manufacturing hydrocarbon polymers of a specified viscosity by correspondingly varying the proportions of sulfur dioxide present in the polymerization or the copolymerization of unsaturated hydrocarbon with boron fluoride catalyst.

This application of sulfur dioxide to regulate the viscosity, and consequently the molecular weight, of hydrocarbon polymers is totally unexpected and unknown in the art. We believe that the polymerization reaction of this invention occurs in three stages: (1) activation of the olefin bond by boron fluoride in the presence of sulfur dioxide to initiate the polymerization reaction; (2) chain growth by reaction of the activated olefin molecule with other olefin molecules at rapid rates to form polymer molecules; (3) termination of chain growth in a given molecular weight range by a little understood chain-transfer action of sulfur dioxide.

It will be noted that in small amounts (less than 1% by volume of the monomers) the action of sulfur dioxide is catalytic in that it activates the boron fluoride catalyst and increases the yield of polymer, whereas in concentrations of from 1% to 50% by volume the chain-transfer properties of sulfur dioxide become foremost. This chain-growth termination in the final polymerization step results in the shortening of the molecular chain, and, consequently, in a lower molecular weight and a lower viscosity of the polymeric product.

As may be seen from the appended graph in which the viscosity of the polymer is plotted as a function of the amount of sulfur dioxide employed (in per cent by volume), the proportion of sulfur dioxide required in each particular case is governed by the viscosity, and consequently by the molecular weight of the polymer or the copolymer to be obtained.

An additional advantage of the process of the present invention consists in producing hydrocarbon polymers of a controlled viscosity in a homogeneous-phase polymerization with boron fluoride catalyst, by employing certain concentrations of the sulfur dioxide "molecular-chain terminator" which corresponds to the desired value of viscosity. Since the polymeric product is thus manufactured to specification grade as a whole, it becomes unnecessary to take distillation cuts from a polymer of broad molecular weight distribution, as is a common practice in the manufacture of viscous polymer oils.

In the practice of the present invention the amount of sulfur dioxide "molecular-chain terminator" should be not less than about 1% by volume of the monomers present and preferably less than that amount as would cause the formation of two phases. In general, maximum viscosity-regulating effects are obtained with amounts of sulfur dioxide from about 1% to about 5% by volume of the monomers. However, additional reduction in viscosity of the polymeric product is secured with sulfur dioxide in greater amounts, e. g., up to 50% and even more by volume. The exact proportion of sulfur dioxide permissible without formation of two phases depends in each particular case on the monomer being polymerized, the temperature of reaction and the amount of diluent if any. For most systems up to 50% by volume is permissible.

The reaction temperature is an important variable of our process. In general, temperatures higher than −10° C. up to 100° C. have a tendency to obscure the chain-terminating effect of sulfur dioxide, since such higher temperatures also tend to produce polymers of lower viscosity. When carried out at atmospheric pressures, the process is operative at temperatures of not lower than about −100° C. and not higher than −10° C. The upper limit of temperature may be raised correspondingly by using higher pressures. If so desired, inert diluents, preferably inert aliphatic hydrocarbons, e. g., butane, may be used with the monomers to be polymerized.

The invention can be best understood from the following description of the tests, the corresponding data in the tables, and the appended graph.

The reaction is carried out in a Pyrex-glass cylinder provided with a Dry Iceacetone condenser. The monomers are fed into the cylinder through an inlet near its top. Sulfur dioxide is condensed separately and poured into the reaction mixture through the vent of the condenser. Thereafter, the mixture is blown with boron fluoride at rates and times as specified in the tables.

copolymerization of propylene and styrene in Table 4.

It is seen from the above data that polymeric products of mono-olefins and diolefins of a desired viscosity grade and molecular weight may be manufactured by varying the effective concentration of sulfur dioxide in accordance with the method of the invention. Special oils and lubricants with properties that cannot be duplicated by the materials produced by petroleum refining methods can now be obtained by our new method employing liquid sulfur dioxide for regulating the viscosity of the polymeric product. Likewise, copolymers of mono-olefins and diolefins suitable for use as synthetic drying oils, for instance copolymers of propylene and butadiene, and valuable chemical intermediates, such as copolymers of olefins and styrene, may be prepared to suit the particular requirements of each case.

It is to be understood, of course, that the conditions and amounts disclosed in the specific examples herein do not in any way limit the scope and the spirit of the present invention, and although the examples disclose only the polymerization of lower olefins, such as propylene and

TABLE 1

Polymerization of propylene

| Test No. | Monomer in c. c. | Butane diluent in c. c. | $SO_2$ in c. c. | Rate of $BF_3$ passage, c. c./Min. | Time in Min. | Yield in Per Cent | Vis. in S. S. U. at 210° F. |
|---|---|---|---|---|---|---|---|
| 1 | 250 | 200 | 0 | 100 | 210 | <2 | 281.2 |
| 2 | 250 | 200 | 2 | 50 | 75 | 55.7 | 140.6 |
| 3 | 250 | 200 | 10 | 50 | 75 | 54.5 | 113.7 |
| 4 | 250 | 200 | 100 | 50 | 75 | 64.0 | 37.3 |

TABLE 2

Polymerization of isobutylene

| Test No. | Monomer in c. c. | Butane diluent in c. c. | $SO_2$ in c. c. | Rate of $BF_3$ passage, c. c./Min. | Time in Min. | Yield in Per Cent | Vis. in S. S. U. at 210° F. |
|---|---|---|---|---|---|---|---|
| 5 | 250 | 200 | 0 | 50 | 35 | 91.8 | 103,36. |
| 6 | 250 | 200 | 2 | 50 | 35 | 70.0 | 5,827 |
| 7 | 250 | 200 | 10 | 50 | 35 | 58.5 | 102.9 |

TABLE 3

Copolymerization of propylene and butadiene

| Test No. | Propylene in c. c. | Butadiene in c. c. | Butane diluent in c. c. | $SO_2$ in c. c. | Amt. of $BF_3$ used in liters | Time in Min. | Vis. in S. S. U. at 210° F. |
|---|---|---|---|---|---|---|---|
| 8 | 200 | 50 | 200 | 0 | 12 | 150 | >10,000 |
| 9 | 200 | 50 | 200 | 10 | 17 | 180 | 226.1 |
| 10 | 200 | 50 | 200 | 50 | 11 | 125 | 57.0 |

Butylenes may also be copolymerized with butadiene under the conditions indicated for the copolymerization of propylene and butadiene in Table 3.

Likewise, butylene may be copolymerized with styrene under the conditions indicated for the isobutylene, in its broader aspects the invention would embrace the polymerization of higher olefins, as for instance pentenes, isoprene, etc.

We claim:

TABLE 4

Copolymerization of propylene and styrene

| Test No. | Propylene in c. c. | Styrene in c. c. | Petroleum ether diluent in c. c. | $SO_2$ in c. c. | Rate of $BF_3$ passage c. c./Min. | Time in Min. | Yield in Per Cent | Vis. in S. S. U. at 210° F. |
|---|---|---|---|---|---|---|---|---|
| 11 | 100 | 30 | 300 | 0 | 50 | 140 | 7.2 | 191 |
| 12 | 100 | 30 | 300 | 2 | 50 | 140 | 53 | 164 |
| 13 | 100 | 30 | 300 | 50 | 50 | 140 | 53.5 | 73.7 |

1. In a process of polymerizing normal mono-olefins in the presence of boron fluoride catalyst, the step of controlling the viscosity of the polymer by incorporation of sulfur dioxide in amounts of from not less than about 1% to about 50% by volume of the mono-olefins.

2. A process as defined in claim 1 wherein the proportion of sulfur dioxide is from about 1% to about 5% by volume of the mono-olefins.

3. A process as defined in claim 1 wherein the normal mono-olefins comprise propylene.

4. A process as defined in claim 1 wherein the mono-olefins comprise propylene and the amount of sulfur dioxide is from about 1% to about 5% by volume of the normal olefins.

5. A process as defined in claim 1 wherein the normal mono-olefins comprise a butylene.

6. In a process of copolymerizing mono-olefins and diolefins in the presence of boron fluoride catalyst, the step of controlling the viscosity of the copolymer by incorporation of sulfur dioxide in an amount of from not less than about 1% to about 50% by volume of the olefin mixture.

7. A process as defined in claim 6 wherein the amount of sulfur dioxide is from about 1% to about 5% by volume of the olefin mixture.

8. A process as defined in claim 6 wherein the mono-olefin comprises propylene and the diolefin is butadiene.

9. A process as defined in claim 6 wherein the mono-olefin comprises a butylene and the diolefin is butadiene.

10. In a process of copolymerizing mono-olefins with styrene in the presence of boron fluoride catalyst, the step of controlling the viscosity of the copolymer by incorporation of sulfur dioxide in an amount of from not less than about 1% to about 50% by volume of the olefin mixture.

11. A process as defined in claim 10 wherein the amount of sulfur dioxide is from 1% to 5% by volume of the olefin mixture.

12. A process as defined in claim 10 wherein the mono-olefin comprises propylene.

13. A process which comprises polymerizing a normal mono-olefin with another olefin miscible therewith, said process comprising catalyzing said polymerization with boron fluoride and controlling the viscosity of the polymer by incorporation of sulfur dioxide in an amount of from not less than about 1% to about 50% by volume of the mixed olefins.

14. A process as defined in claim 13 wherein the amount of sulfur dioxide is from 1% to 5% by volume of the mixed olefins.

WILLIAM E. ELWELL.
RICHARD L. MEIER.

REFERENCES CITED

The following references are of record in the file of this patent:

UNITED STATES PATENTS

| Number | Name | Date |
|---|---|---|
| 2,142,980 | Huijser et al. | Jan. 3, 1939 |
| 2,220,307 | Whiteley et al. | Nov. 5, 1940 |
| 2,229,661 | Mann | Jan. 28, 1941 |
| 2,274,749 | Smyers | Mar. 3, 1942 |
| 2,296,399 | Otto et al. | Sept. 22, 1942 |

Certificate of Correction

Patent No. 2,442,644.  June 1, 1948.

WILLIAM E. ELWELL ET AL.

It is hereby certified that errors appear in the printed specification of the above numbered patent requiring correction as follows: Column 3, line 18, for "Dry Iceacetone" read *Dry Ice acetone*; Table 2, last column thereof, for "103,36." read *103,367*; same column 3, next to last line, for the word "butylene" read *butylenes*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.* the step of controlling the viscosity of the polymer by incorporation of sulfur dioxide in amounts of from not less than about 1% to about 50% by volume of the mono-olefins.

2. A process as defined in claim 1 wherein the proportion of sulfur dioxide is from about 1% to about 5% by volume of the mono-olefins.

3. A process as defined in claim 1 wherein the normal mono-olefins comprise propylene.

4. A process as defined in claim 1 wherein the mono-olefins comprise propylene and the amount of sulfur dioxide is from about 1% to about 5% by volume of the normal olefins.

5. A process as defined in claim 1 wherein the normal mono-olefins comprise a butylene.

6. In a process of copolymerizing mono-olefins and diolefins in the presence of boron fluoride catalyst, the step of controlling the viscosity of the copolymer by incorporation of sulfur dioxide in an amount of from not less than about 1% to about 50% by volume of the olefin mixture.

7. A process as defined in claim 6 wherein the amount of sulfur dioxide is from about 1% to about 5% by volume of the olefin mixture.

8. A process as defined in claim 6 wherein the mono-olefin comprises propylene and the diolefin is butadiene.

9. A process as defined in claim 6 wherein the mono-olefin comprises a butylene and the diolefin is butadiene.

10. In a process of copolymerizing mono-olefins with styrene in the presence of boron fluoride catalyst, the step of controlling the viscosity of the copolymer by incorporation of sulfur dioxide in an amount of from not less than about 1% to about 50% by volume of the olefin mixture.

11. A process as defined in claim 10 wherein the amount of sulfur dioxide is from 1% to 5% by volume of the olefin mixture.

12. A process as defined in claim 10 wherein the mono-olefin comprises propylene.

13. A process which comprises polymerizing a normal mono-olefin with another olefin miscible therewith, said process comprising catalyzing said polymerization with boron fluoride and controlling the viscosity of the polymer by incorporation of sulfur dioxide in an amount of from not less than about 1% to about 50% by volume of the mixed olefins.

14. A process as defined in claim 13 wherein the amount of sulfur dioxide is from 1% to 5% by volume of the mixed olefins.

WILLIAM E. ELWELL.
RICHARD L. MEIER.

REFERENCES CITED

The following references are of record in the file of this patent:

UNITED STATES PATENTS

| Number | Name | Date |
| --- | --- | --- |
| 2,142,980 | Huijser et al. | Jan. 3, 1939 |
| 2,220,307 | Whiteley et al. | Nov. 5, 1940 |
| 2,229,661 | Mann | Jan. 28, 1941 |
| 2,274,749 | Smyers | Mar. 3, 1942 |
| 2,296,399 | Otto et al. | Sept. 22, 1942 |

---

Certificate of Correction

Patent No. 2,442,644.      June 1, 1948.

WILLIAM E. ELWELL ET AL.

It is hereby certified that errors appear in the printed specification of the above numbered patent requiring correction as follows: Column 3, line 18, for "Dry Iceacetone" read *Dry Ice acetone*; Table 2, last column thereof, for "103,36." read *103,367*; same column 3, next to last line, for the word "butylene" read *butylenes*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*